(12) United States Patent
Brunick et al.

(10) Patent No.: US 12,263,765 B2
(45) Date of Patent: Apr. 1, 2025

(54) METHOD AND APPARATUS FOR A ROTATABLE CHILD SAFETY SEAT

(71) Applicant: GRACO CHILDREN'S PRODUCTS, INC., Atlanta, GA (US)

(72) Inventors: Daniel J. Brunick, Cumming, GA (US); Thomas Jake Mitchell, Atlanta, GA (US); Andrew Phillip Kitchens, Kennesaw, GA (US); David Hotard, Atlanta, GA (US)

(73) Assignee: GRACO CHILDREN'S PRODUCTS INC., Atlanta, GA (US)

( * ) Notice: Subject to any disclaimer, the term of this patent is extended or adjusted under 35 U.S.C. 154(b) by 0 days.

(21) Appl. No.: 18/530,859

(22) Filed: Dec. 6, 2023

(65) Prior Publication Data

US 2024/0149759 A1 May 9, 2024

Related U.S. Application Data

(63) Continuation of application No. 17/592,812, filed on Feb. 4, 2022, now Pat. No. 11,884,188, which is a
(Continued)

(51) Int. Cl.
*B60N 2/28* (2006.01)

(52) U.S. Cl.
CPC ......... *B60N 2/2869* (2013.01); *B60N 2/2806* (2013.01); *B60N 2/2821* (2013.01); *B60N 2/2875* (2013.01)

(58) Field of Classification Search
CPC ................ B60N 2/2821; B60N 2/2869; B60N 2/2806; B60N 2/2875
(Continued)

(56) References Cited

U.S. PATENT DOCUMENTS

| 4,762,364 A | 8/1988 | Young |
| 6,199,949 B1 * | 3/2001 | DaSilva ............... B60N 2/2857 297/256.16 |

(Continued)

FOREIGN PATENT DOCUMENTS

| AU | 2003227330 B2 | 1/2009 |
| AU | 2003227341 B2 | 9/2009 |

(Continued)

*Primary Examiner* — Milton Nelson, Jr.
(74) *Attorney, Agent, or Firm* — Eversheds Sutherland (US) LLP

(57) ABSTRACT

A rotatable child safety seat can include a seat shell for receiving a child therein. a rotating pedestal, and a seat base. The pedestal and seat shell can rotate with respect to the seat base. The pedestal can include a locking pin and the seat base can include a multitude of pin receiving apertures that allow a user to rotate the seat shell and pedestal in either a clockwise or counter-clockwise direction at a number of different angles or positions. The child safety seat can also include two separate seat belt/LATCH tether pathways. One seat belt/LATCH tether pathway can be provided on the seat back of the seal shell and can be used when the child safety seat is in a forward-facing configuration and the other seat belt/LATCH tether pathway can be provided in the seat base and used when in a rearward-facing configuration.

17 Claims, 10 Drawing Sheets

Related U.S. Application Data continuation of application No. 17/087,539, filed on Nov. 2, 2020, now Pat. No. 11,260,779, which is a continuation of application No. 15/876,942, filed on Jan. 22, 2018, now Pat. No. 10,829,012.

(60) Provisional application No. 62/449,319, filed on Jan. 23, 2017.

(58) Field of Classification Search
USPC .......................... 297/256.16, 256.14, 256.12
See application file for complete search history.

(56) References Cited

U.S. PATENT DOCUMENTS

| | | | |
|---|---|---|---|
| 6,505,887 B2 | 1/2003 | Hampton | |
| 6,520,579 B2 | 2/2003 | Kassai et al. | |
| 6,543,846 B2 | 4/2003 | Cone | |
| 6,554,358 B2 | 4/2003 | Kain | |
| 6,863,345 B2 | 3/2005 | Kain | |
| 7,029,068 B2 | 4/2006 | Yoshida et al. | |
| 7,090,294 B2 | 8/2006 | Balensiefer et al. | |
| 7,163,265 B2* | 1/2007 | Adachi | B60N 2/2875 297/256.16 |
| 7,575,276 B1 | 8/2009 | Henry | |
| 7,731,284 B2 | 6/2010 | Lhomme et al. | |
| 7,735,921 B2 | 6/2010 | Hutchinson et al. | |
| 7,901,003 B2 | 3/2011 | Meeker et al. | |
| 7,984,947 B2 | 7/2011 | Pos | |
| 8,317,265 B2* | 11/2012 | Hutchinson | B60N 2/286 297/256.16 |
| 8,322,788 B2 | 12/2012 | Williams et al. | |
| 8,430,452 B2 | 4/2013 | Brunick et al. | |
| 8,459,739 B2 | 6/2013 | Tamanouchi et al. | |
| 8,596,718 B2 | 12/2013 | Gaudreau et al. | |
| 8,714,644 B2 | 5/2014 | Biaud | |
| 9,010,857 B2 | 4/2015 | Hong-Bo | |
| 9,126,509 B2 | 9/2015 | Biaud et al. | |
| 9,150,126 B1 | 10/2015 | Kitchens et al. | |
| 9,327,619 B2 | 5/2016 | Taylor et al. | |
| 9,365,135 B2 | 6/2016 | Carpenter | |
| 9,415,706 B2 | 8/2016 | Rabeony | |
| 9,499,074 B2 | 11/2016 | Strong et al. | |
| 9,527,411 B2 | 12/2016 | Szakelyhidi et al. | |
| 9,592,751 B2 | 3/2017 | Kirstein | |
| 9,840,169 B2 | 12/2017 | Mason et al. | |
| 9,937,823 B2 | 4/2018 | Williams et al. | |
| 9,969,304 B2 | 5/2018 | Johnson et al. | |
| 10,081,273 B2 | 9/2018 | Johnson et al. | |
| 10,322,651 B2 | 6/2019 | Hutchinson et al. | |
| 2002/0163232 A1* | 11/2002 | Vezinet | B60N 2/2845 297/183.2 |
| 2006/0197364 A1 | 9/2006 | Bendure et al. | |
| 2011/0254331 A1* | 10/2011 | Nagelski | B60N 2/2845 297/256.16 |
| 2011/0298257 A1 | 12/2011 | Abadilla et al. | |
| 2015/0336481 A1 | 11/2015 | Horsfall | |

FOREIGN PATENT DOCUMENTS

| | | |
|---|---|---|
| CN | 201124777 Y | 10/2008 |
| CN | 100448714 C | 1/2009 |
| CN | 201833905 U | 5/2011 |
| CN | 102015364 B | 3/2013 |
| CN | 204547845 U | 8/2015 |
| CN | 106740306 A | 5/2017 |
| CN | 104859496 B | 10/2017 |
| CN | 207790408 U | 8/2018 |
| CN | 207790409 U | 8/2018 |
| EP | 0281396 B1 | 9/1988 |
| EP | 0497501 A1 | 8/1992 |
| EP | 0559324 B1 | 9/1993 |
| EP | 1416022 A1 | 5/2004 |
| EP | 1403131 A3 | 6/2005 |
| EP | 1638803 B1 | 12/2006 |
| EP | 2371621 B1 | 6/2017 |
| FR | 2935311 A1 | 3/2010 |
| GB | 2562830 B | 5/2019 |
| JP | 3117917 B2 | 9/1995 |
| JP | 4294177 B2 | 4/2001 |
| JP | 4073233 B2 | 2/2008 |
| JP | 2015-040034 A | 8/2013 |
| JP | 3186995 U | 10/2013 |
| JP | 5840502 B2 | 1/2016 |
| JP | 6600716 B2 | 10/2019 |
| KR | 101642010 B1 | 7/2016 |
| TW | 3777138 B | 11/2012 |
| WO | 00/69629 | 11/2000 |
| WO | 2004104087 A2 | 2/2004 |
| WO | 2015025554 A1 | 3/2014 |
| WO | 2015027275 A1 | 3/2015 |

* cited by examiner

METHOD AND APPARATUS FOR A ROTATABLE CHILD SAFETY SEAT

RELATED APPLICATIONS

This application is a continuation of U.S. application Ser. No. 17/592,812, filed Feb. 4, 2022, which is a continuation of U.S. application Ser. No. 17/087,539, filed Nov. 2, 2020 and issued as U.S. Pat. No. 11,260,779, which is a continuation of U.S. application Ser. No. 15/876,942, filed Jan. 22, 2018 and issued as U.S. Pat. No. 10,829,012, which claims the benefit of U.S. Provisional Application Ser. No. 62/449,319, filed Jan. 23, 2017, each of which are hereby incorporated herein by reference in their entirety for all purposes.

TECHNICAL FIELD

Embodiments disclosed herein are generally related to child and infant car seats and more particularly to apparatuses and methods for a child/infant car seat that is rotatable when installed in an automobile.

BACKGROUND

Various automobile child safety seats have been developed to increase the safety of an infant or child (referred to generically as "child" hereinafter) as the ride in an automobile. These automobile child car safety seats are designed to be placed on the seat of the automobile. The conventional child car seats can be coupled to one of the automobile's passenger seat belt systems or via a LATCH (Lower Anchors and Tethers for Children) system to hold the child car seat in place on along the top surface of the automobile seat. In addition, the child car seat can include its own harness restraint system (e.g., a 2-point, 3-point, 4-point, or 5-point harness). Many features have been provided to improve the ergonomic aspects of using these child car seats. One ergonomic feature of conventional child car seats is to make a way for it to by making the car seat rotatable with respect to its seat base.

However, to provide a seat that is fully rotatably has generally required an overly large seat base in order to provide sufficient protection to the child passenger when the car seat is positioned in both the forward-facing and rearward-facing configuration. This results in a heavy and unwieldy car seat that can be difficult to move when desired by the user. Further, conventional car rotating car seats have provided the attachment points for the automobile seat belt or tether for the LATCH system at the seat base of the car seat in order to not affect the rotational capability of the car seat. This single point of connection to the seat base for the automobile seat belt system or tether of the LATCH system, even when the seat is in a front-facing configuration, results in a lower harness weight rating, which means only smaller infants and toddlers can be safely placed within the conventional rotating seats.

BRIEF DESCRIPTION OF THE SEVERAL VIEWS OF THE DRAWINGS

For a more complete understanding of the present disclosure and certain features thereof, reference is now made to the following description, in conjunction with the accompanying figures briefly described as follows.

DETAILED DESCRIPTION OF THE EXEMPLARY EMBODIMENTS

Example embodiments of the disclosure now will be described more fully hereinafter with reference to the accompanying drawings, in which exemplary embodiments are shown. The concepts discussed herein may, however, be embodied in many different forms and should not be construed as limited to the example embodiments set forth herein; rather, these embodiments are provided so that this disclosure will be thorough and complete, and will fully convey the scope to those of ordinary skill in the art. Like numbers refer to like, but not necessarily the same or identical, elements throughout.

Certain dimensions and features of the novel rotatable automobile child car safety seat are described herein using the term "approximately." As used herein, the term "approximately" indicates that each of the described dimensions is not a strict boundary or parameter and does not exclude functionally similar variations therefrom. Unless context or the description indicates otherwise, the use of the term "approximately" in connection with a numerical parameter indicates that the numerical parameter includes variations that, using mathematical and industrial principles accepted in the art (e.g., rounding, measurement or other systematic errors, manufacturing tolerances, etc.), would not vary the least significant digit.

In addition, certain relationships between dimensions of the rotatable automobile child car safety seat described herein and between features of the rotatable automobile child car safety seat are described herein using the term "substantially." As used herein, the terms "substantially" and "substantially equal" indicates that the equal relationship is not a strict relationship and does not exclude functionally similar variations therefrom. Unless context or the description indicates otherwise, the use of the term "substantially" or "substantially equal" in connection with two or more described dimensions or positions indicates that the equal relationship between the dimensions or positions includes variations that, using mathematical and industrial principles accepted in the art (e.g., rounding, measurement or other systematic errors, manufacturing tolerances, etc.), would not vary the least significant digit of the dimensions. As used herein, the term "substantially constant" indicates that the constant relationship is not a strict relationship and does not exclude functionally similar variations therefrom. As used herein, the term "substantially parallel" indicates that the parallel relationship is not a strict relationship and does not exclude functionally similar variations therefrom.

Figure 1A:
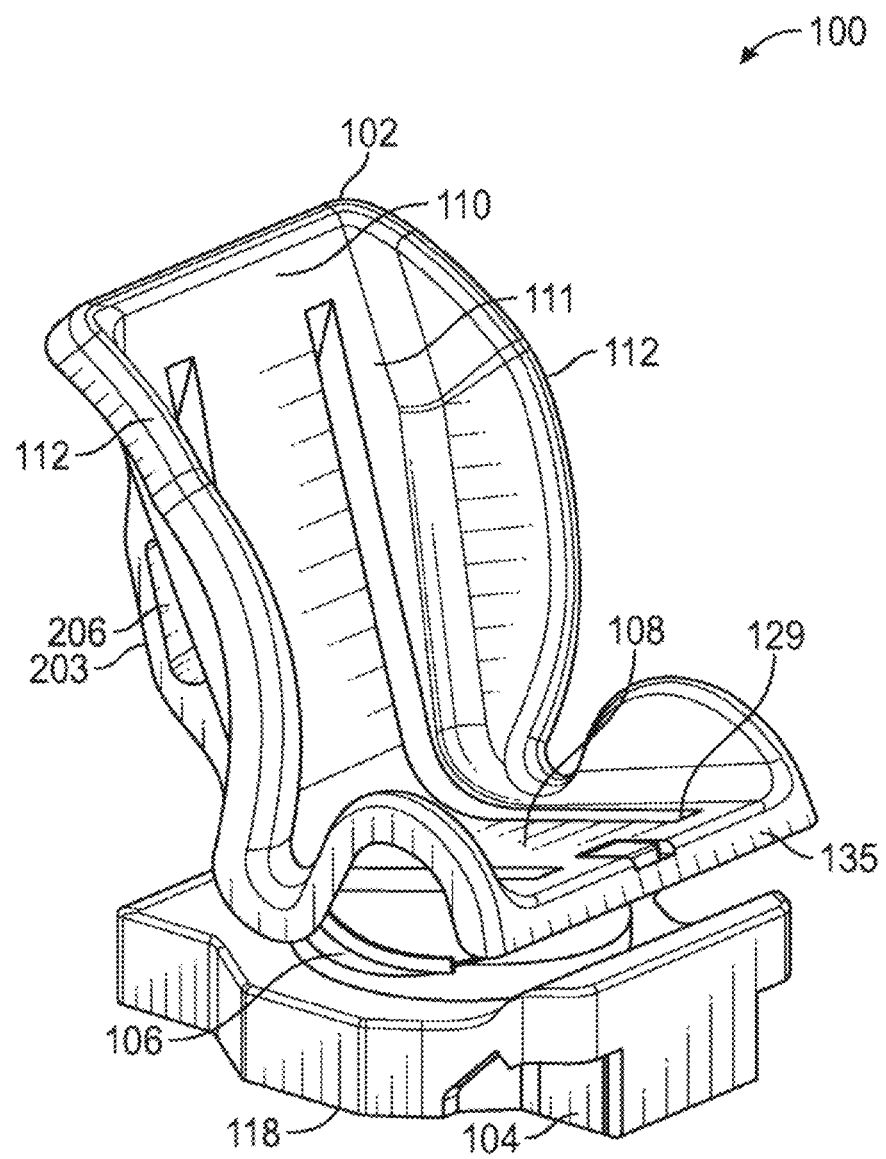
FIGS. 1A-F illustrate various views of a rotatable child car seat in accordance with one example embodiment of the disclosure.
Figure 1B:
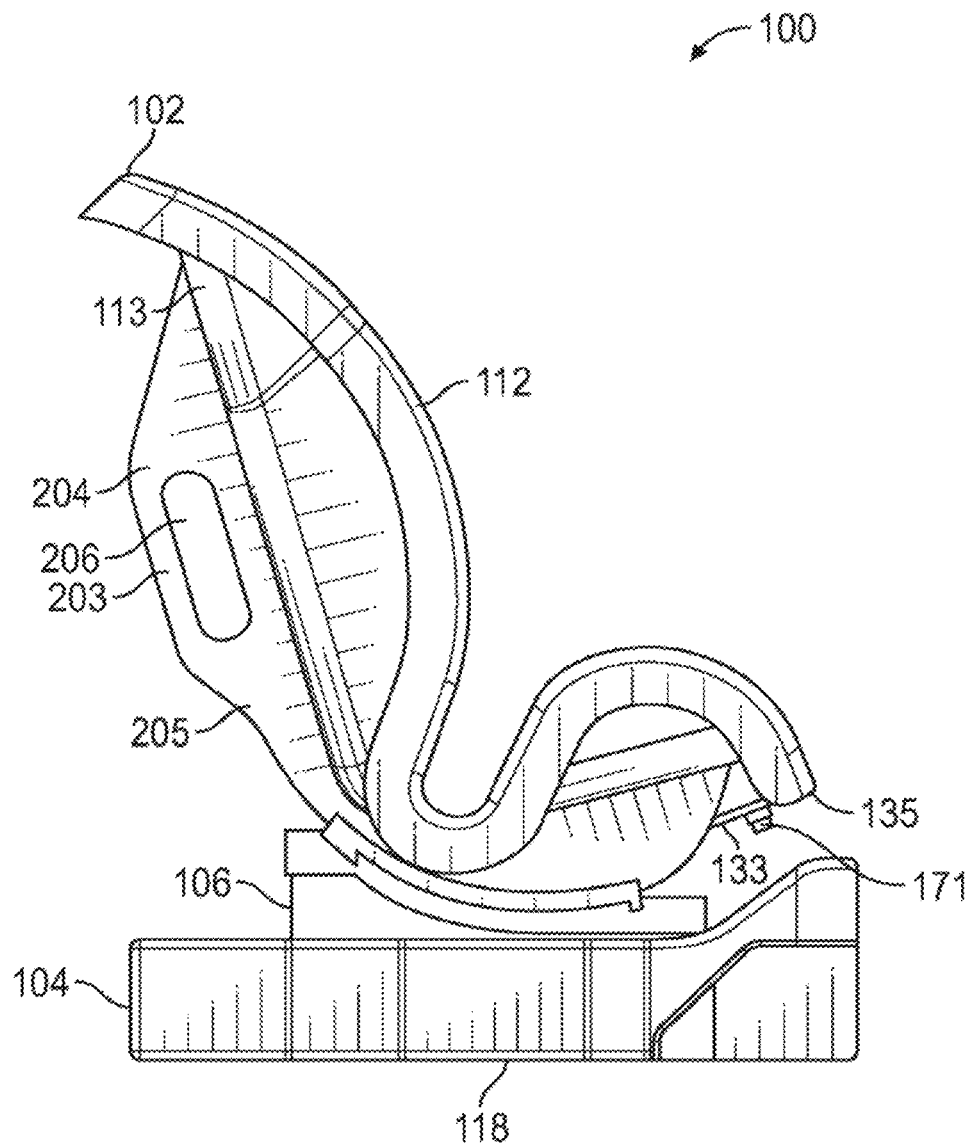
Figure 1C:
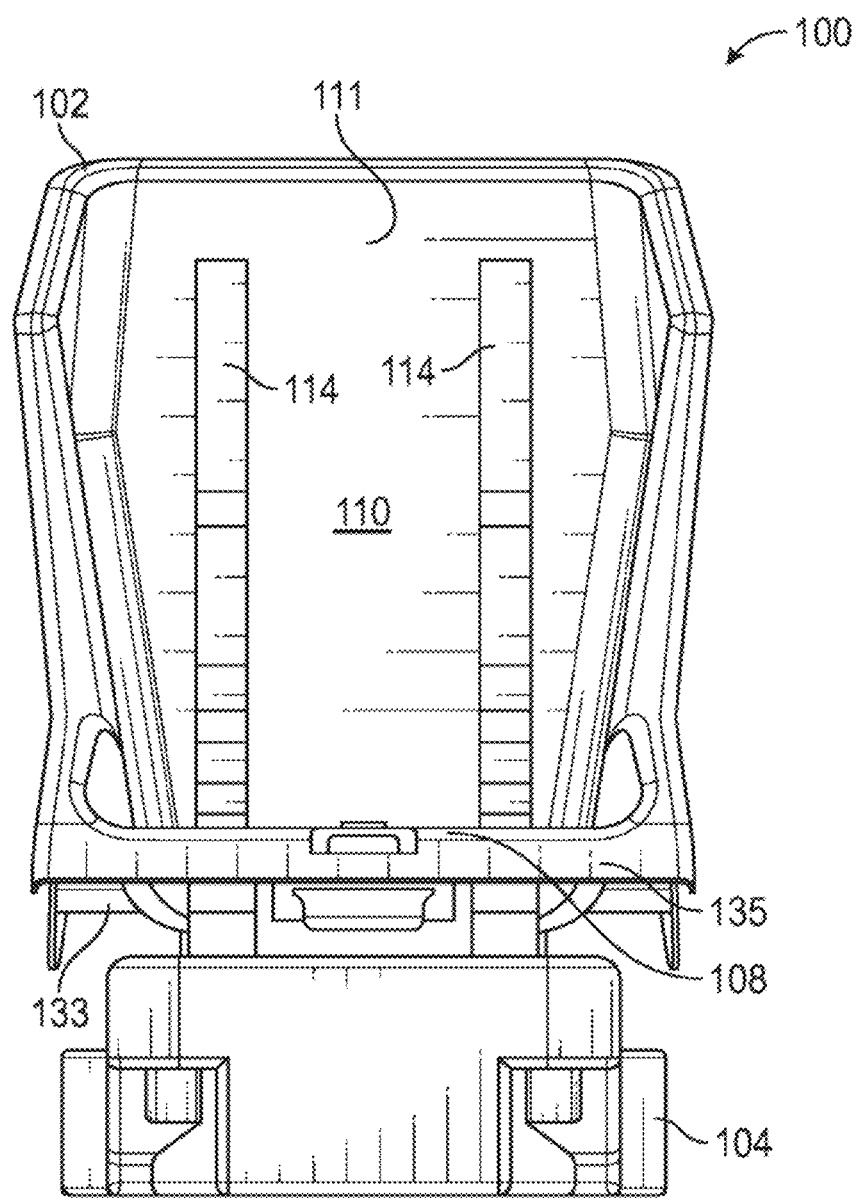
Figure 1D:
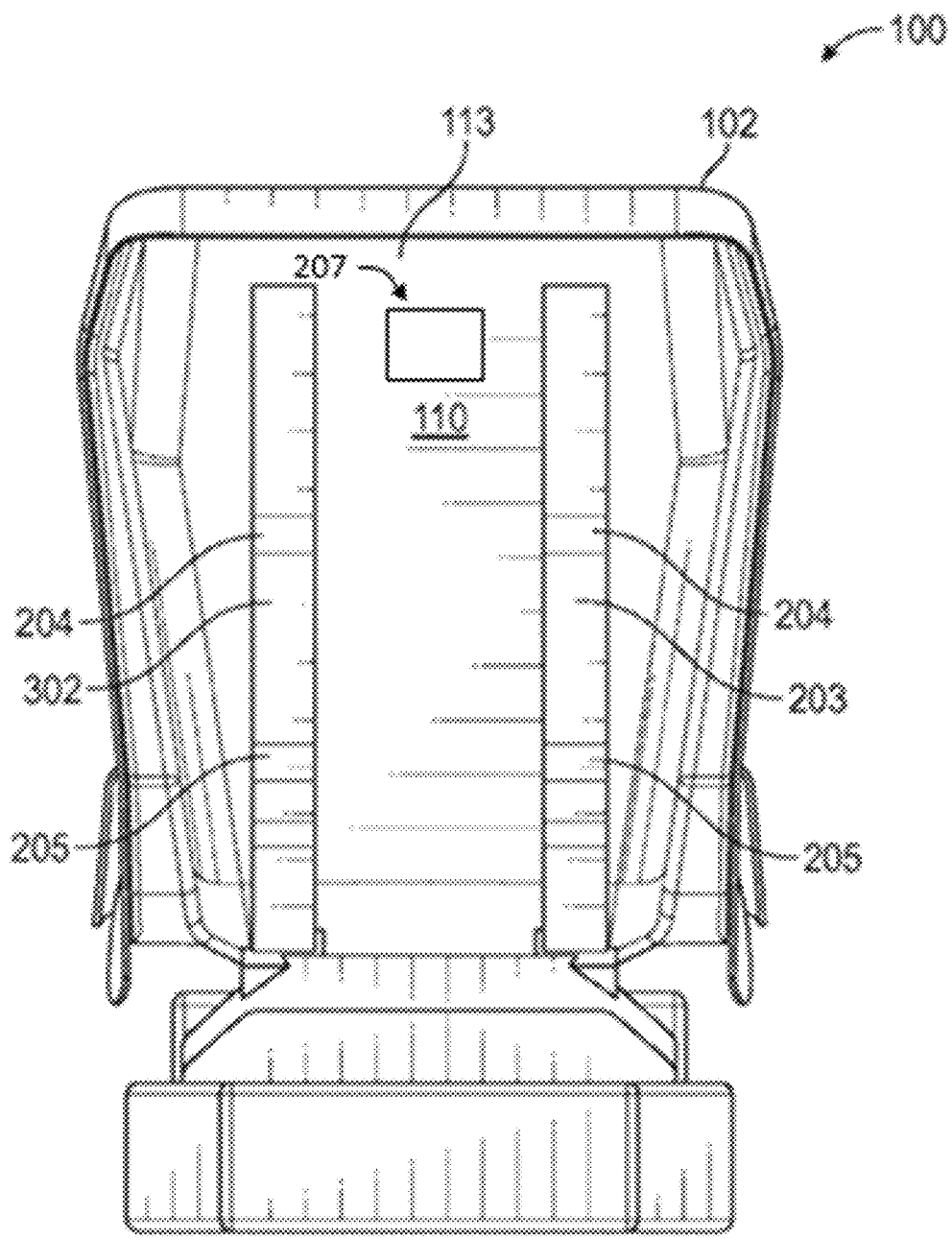
Figure 1E:
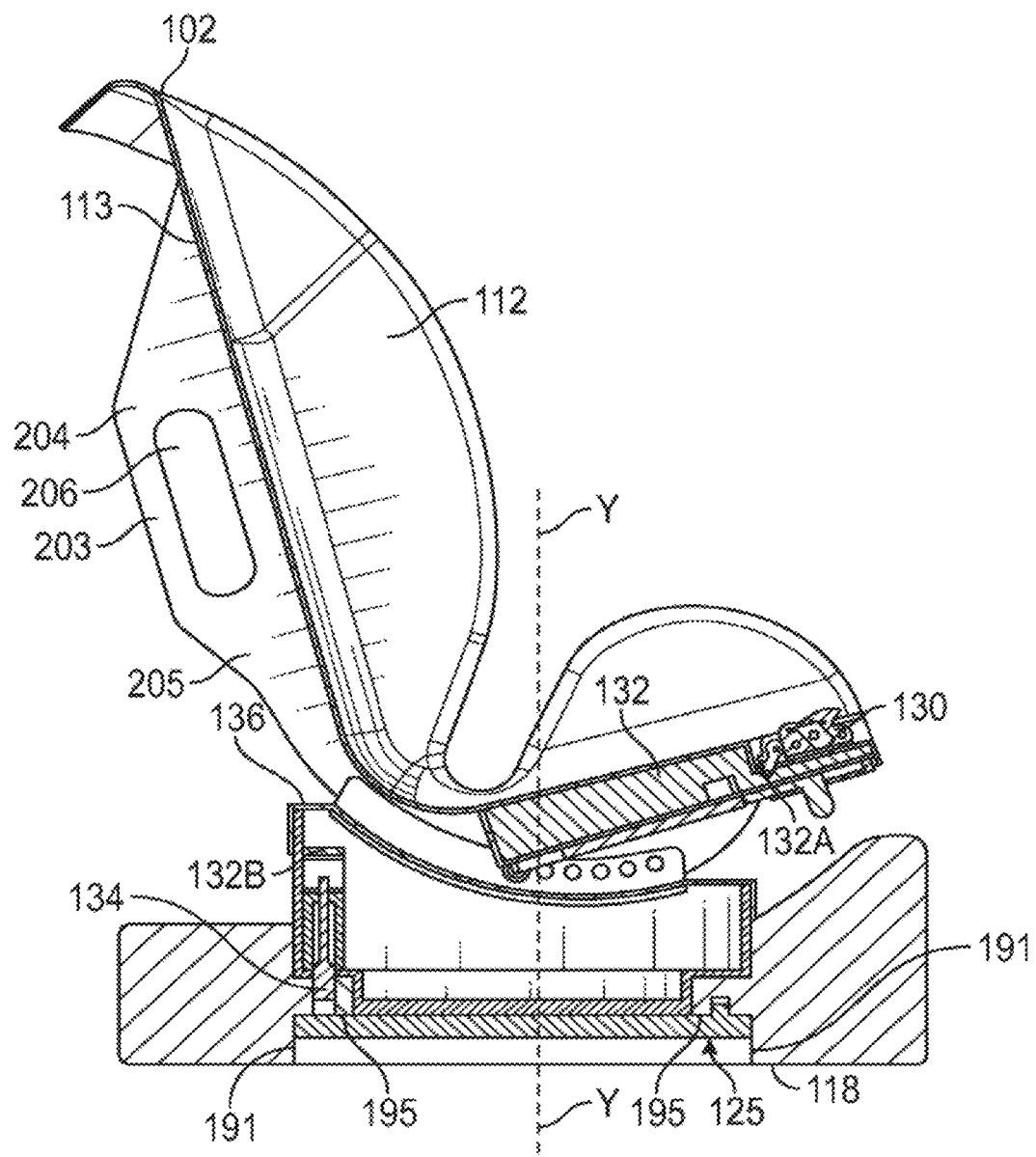
Figure 1F:
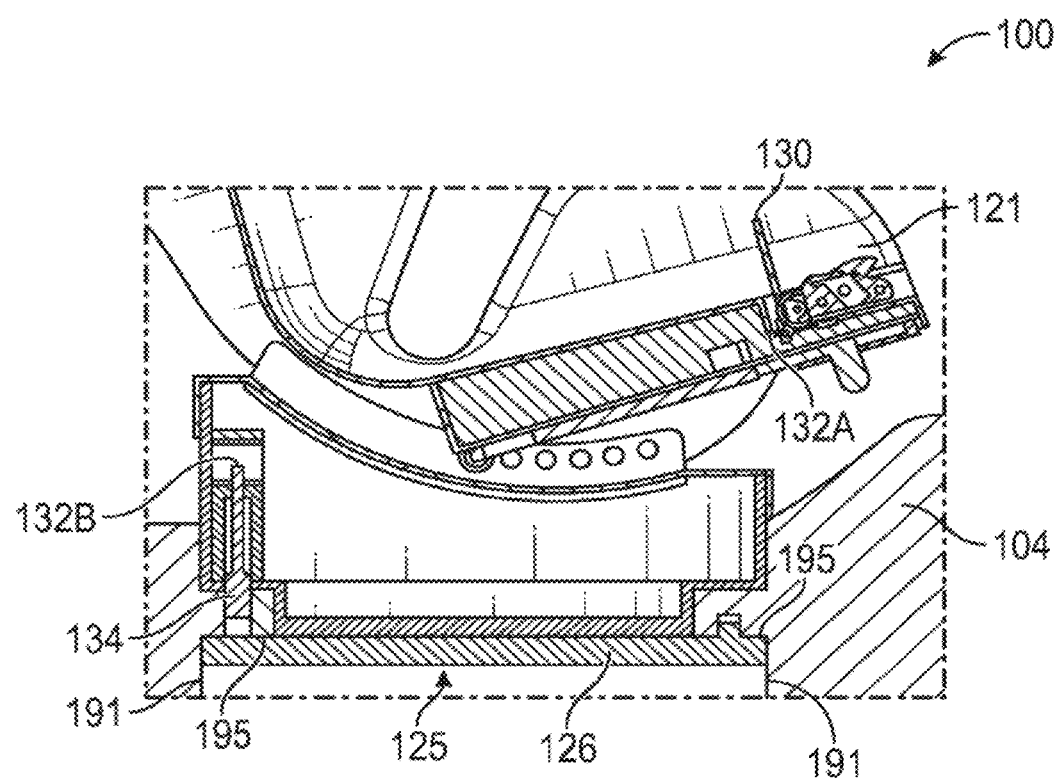
Figure 2A:
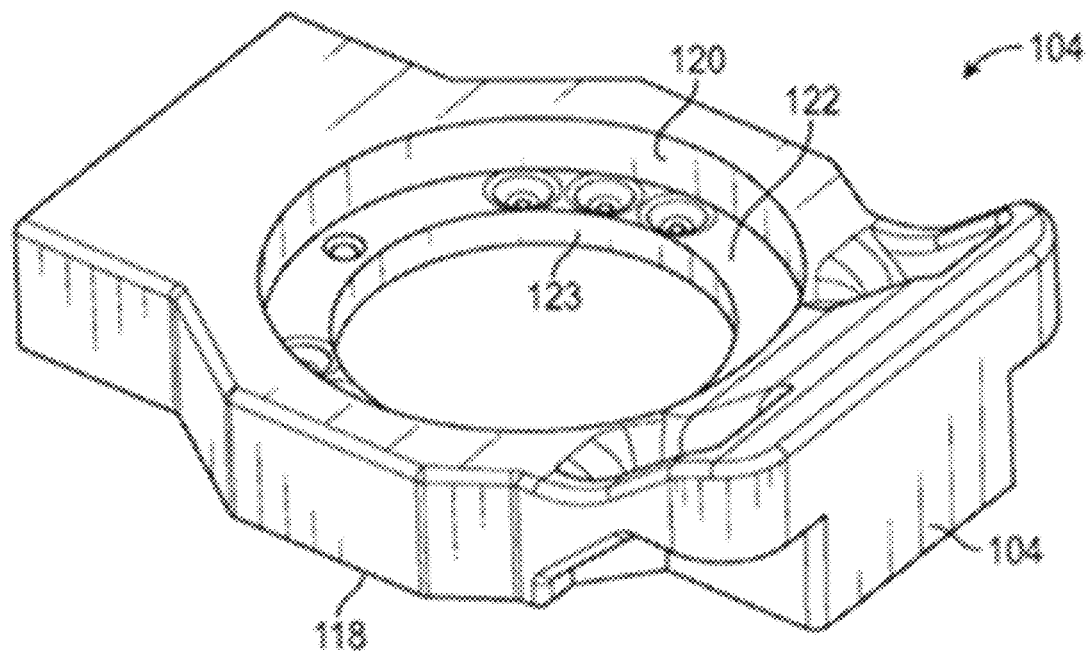
FIGS. 2A-B illustrate perspective and top plan views of a seat base for the rotatable child car seat of FIGS. 1A-F in accordance with one example embodiment of the disclosure.
Figure 2B:
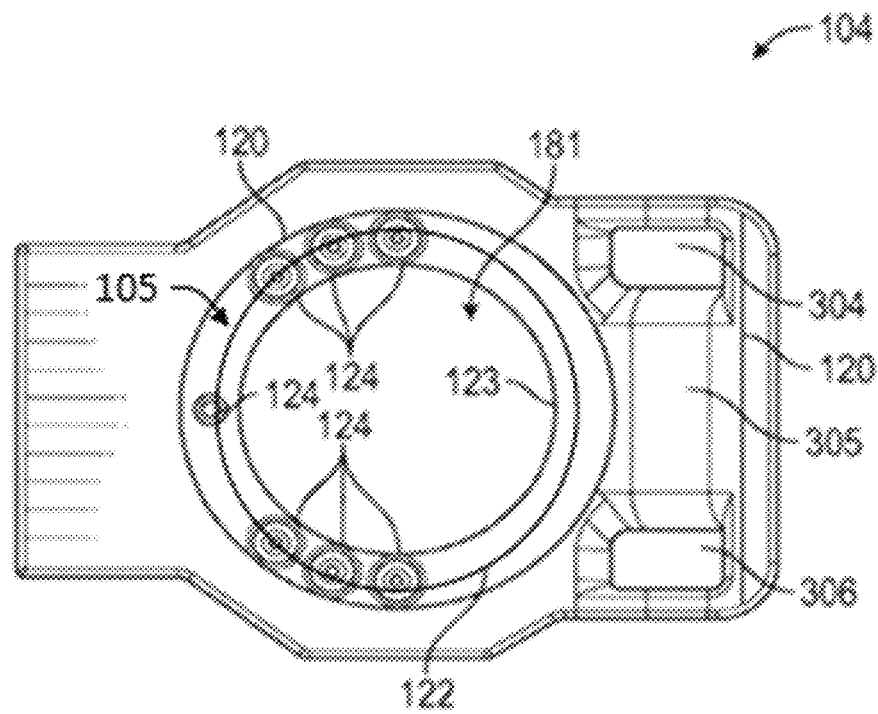
Figure 3A:
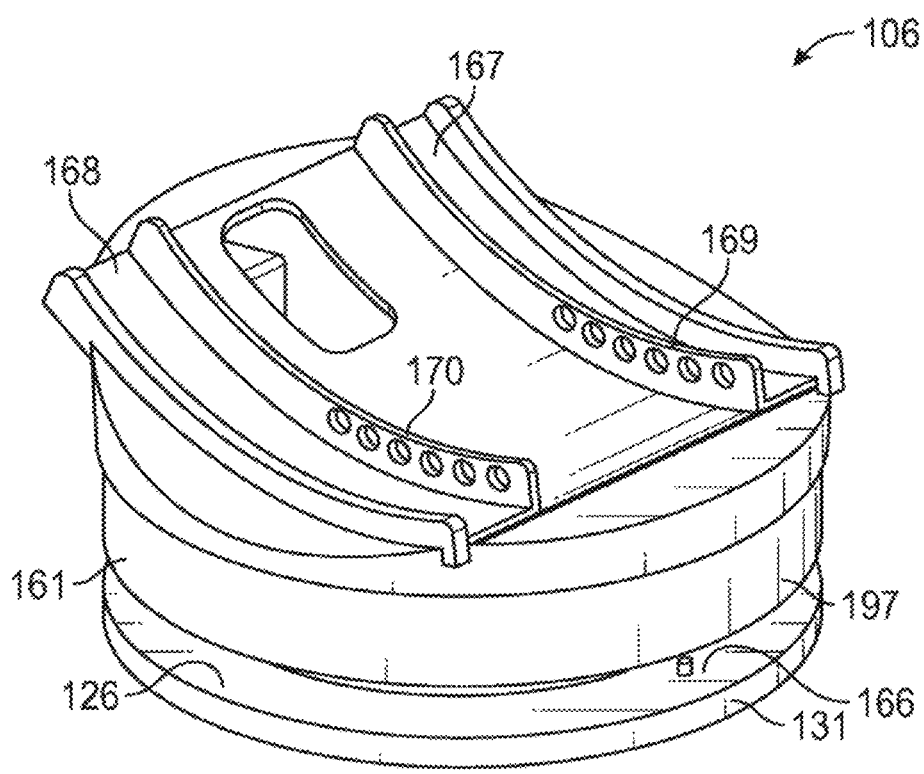
FIGS. 3A-B illustrate perspective and side elevation views of the rotating pedestal for the child car seat of FIGS. 1A-F in accordance with one example embodiment of the disclosure.
Figure 3B:
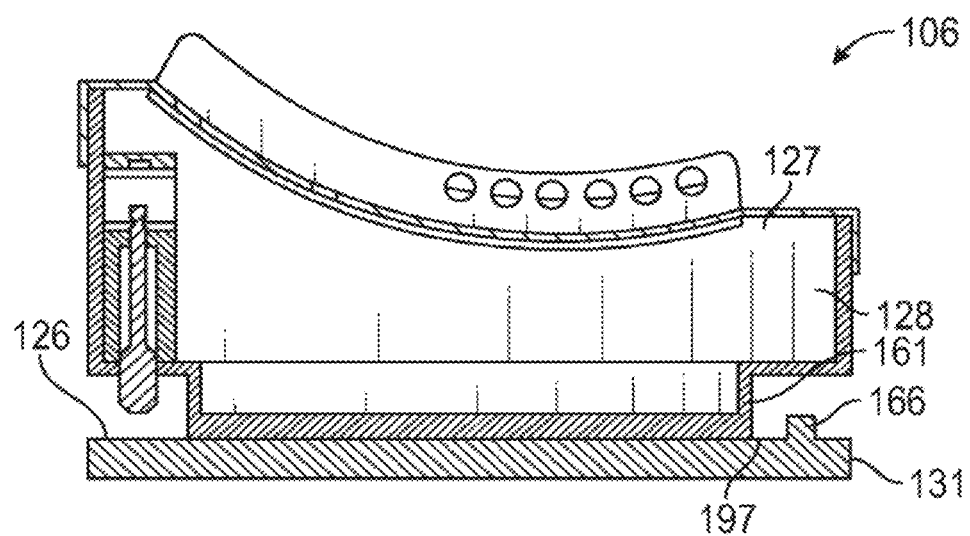

FIG. 1A presents a perspective view of a rotatable automobile child car safety seat 100 in accordance with one example embodiment of the disclosure. FIG. 1B presents a side elevation view of the rotatable automobile child car safety seat 100 of FIG. 1A. FIG. 1C presents a front elevation view of the rotatable automobile child car safety seat 100 of FIGS. 1A-B in accordance with one example embodiment of the disclosure. FIG. 1D presents a rear elevation view of the rotatable automobile child car safety seat 100 of FIGS. 1A-C in accordance with one example embodiment of the disclosure. FIG. 1E presents a cross-sectional view of the rotatable automobile child car safety seat 100 of FIGS. 1A-D in accordance with one example embodiment of the disclosure. FIG. 1F is a partial cross-sectional view of the rotatable automobile child car safety seat 100 of FIGS. 1A-E in accordance with one example embodiment of the disclosure. FIGS. 2A-B present perspective and top plan views of a seat base 104 for the rotatable automobile child car safety seat 100 of FIGS. 1A-F in accordance with one example embodiment of the disclosure. FIGS. 3A-B present perspective and side elevation views of the rotating pedestal 106 for the rotatable automobile child car safety seat 100 of FIGS. 1A-F in accordance with one example embodiment of the disclosure.

Now referring to FIGS. 1A-3B, the example rotatable automobile child car safety seat 100 can include a seat shell 102. The rotatable child safety seat 100 can include a seat base 104 disposed beneath the seat shell 102, and a rotating pedestal 106 disposed generally between the seat base 106 and the seat shell 102. In one example, the seat shell 102 can be coupled to the rotating pedestal 106 and the rotating pedestal 106 can be rotatably coupled to or be rotatable within the seat base 104.

The seat shell 102 of the car seat 100 can be made of any material including, but not limited to, plastic, metal, composite, or a combination thereof. In one example embodiment, the seat shell 102 can be formed of a molded plastic and can include a front side, for receiving a child therein, and an opposing rear side. The front side of the seat shell 102 can include a seat back 110 or backrest and a seat bottom 108, upon which a child can sit. The seat shell 102 can also include a pair of side retaining walls 112 extending forward from the seat back 110 at or adjacent to the opposing, vertically-extending lateral sides of the seat back 110. In one example, the side retaining walls 112 are configured to limit side-to-side movement of the child while in the car seat 100 and can be integrally formed with the seat shell 102 or coupled to a portion of the seat back 110. All or a portion of the seat shell 102 can be covered in padding and/or soft goods (e.g., padding, fabric, leather, faux leather, and/or another material) to increase the comfort level of sitting in the car seat 100.

The rotatable automobile child car safety seat 100 can also include a first central adjuster (not shown) disposed generally along the front side 135 of the seat bottom 108 of the seat shell 102. The first central adjuster can include a slot or passageway (not shown) disposed through the seat shell 102 of the car seat 100 that extends from the front 135 or top side of the seat bottom 108 to a bottom side 133 of the seat bottom 108 under the seat shell 102. In one example, the slot can define an opening to and provide a passageway through the seat shell 102 from the bottom side 133 of the seat bottom 108 to a front side 135 of the seat bottom 108. In certain example embodiments the slot further provides a passageway from the front side 135 of the seat bottom 108 to a rear side of the seat shell 102 (e.g., along the rear side of the seat back 110).

The rotatable automobile child car safety seat 100 can also include a pair of armrests (not shown). Each armrest can be positioned above the top surface 129 of the seat bottom 108. For example, each armrest can be coupled to or integrally formed with the seat shell 102 of the car seat 100 along opposing lateral sides of the seat bottom 108. The car seat 100 can also include a child restraint system (not shown). The child restraint system can include at least a pair of shoulder straps or belts. Each of the shoulder belts can include a first end and a distal second end. The first end of each shoulder belt can be removably coupled directly or indirectly to the seat shell 102 of the car seat 100. In one example embodiment, each first end of each shoulder belt may be threaded through or otherwise slidably attached and adjustable along a chest harness (not shown). The chest harness can be removably coupled to a chest harness clip (not shown). In one example, the chest harness can include a latch plate (not shown) that is configured to be removably coupled to the chest harness clip. For example, the chest harness clip can be coupled directly or indirectly to the seat shell and can include a latch (not shown) having a release mechanism. The latch can be configured to receive the latch plate and couple the chest harness to the chest harness clip. The release mechanism is configured to disengage the chest harness from the chest harness clip by, for example, releasing the latch plate from the latch.

The second end of each the shoulder belt can be coupled to one end of a strap tensioning mechanism that is positioned along the rear side 113 of the seat back 110 of the seat shell 102. For example, each shoulder belt can be fed through one of multiple harness slots (not shown) in a seat back 110 of the seat shell 102. Each harness slot can define a passageway from the front side 111 to the rear side 113 of the seat back 110 of the seat shell 102. In one example, the multiple harness slots can be paired (such that each receives one of the at least two shoulder belts) and oriented vertically along the seat back 110 of the seat shell 102 to provide a vertical positioning adjustment for the shoulder belts as they pass from the front side 111 of the seat back 110 to the rear side 113 of the seat back 110. In one example, four pairs of harness slots are oriented vertically along the seat back 110 of the seat shell 102. However, greater or fewer numbers of harness slots can be provided along the seat back 110.

The seat base 104 can include a bottom surface 118, one or more side walls 120 that extend generally vertically upward from the bottom surface 118, and one or more retaining flanges 122 or rims. In one example, the retaining flange 122 can be a portion of the seat base 104 that extends radially inward from the one or more side walls 120, such that the side wall defines a first inner wall, the retaining flange 122 defines a second inner wall and the diameter of the second inner wall is less than the diameter of the first inner wall. This results in the flange 122 reducing the size and/or diameter of the opening 181 into the seat base 104. The flange 122 is also configured to assist in holding or maintaining a rotating pedestal base 126 within a cavity 125 of the seat base 104 positioned below the retaining flange 122.

The side wall of the seat base 104 can include one or more side walls that extend around the outer edge of the bottom surface 118 of the seat base 104. Further, the seat base 104 can include an inner wall surface 191 that, along with the bottom surface 118 and the flange 122 define the cavity 195. The inner wall surface 191 can extend orthogonally from the bottom surface 118 in certain example embodiments. In other embodiments, the inner wall surface 191 can extend at an acute or orthogonal angle to the bottom surface 118. In one example, the inner wall surface 191 can define another annular ring-shaped opening along the bottom side of the seat base 104 that has a diameter that is greater than the diameter of the diameter of the opening defined by the second inner wall of the retaining flange. The bottom surface 118 can include a bottom side that is flat or substantially flat and configured to rest upon a top surface of an automobile seat 202 (see FIG. 4).

In one example, a single retaining flange 122 is provided and the retaining flange 122 is formed along an inner wall of the one or more side walls 120 and extends radially inward from the side walls 120 toward the rotational axis Y of the rotating child car seat 100. The example retaining flange 122 can have an inner wall 123 that defines, for example, an annular ring disposed above and vertically separated from the bottom surface 118.

Figure 5A:
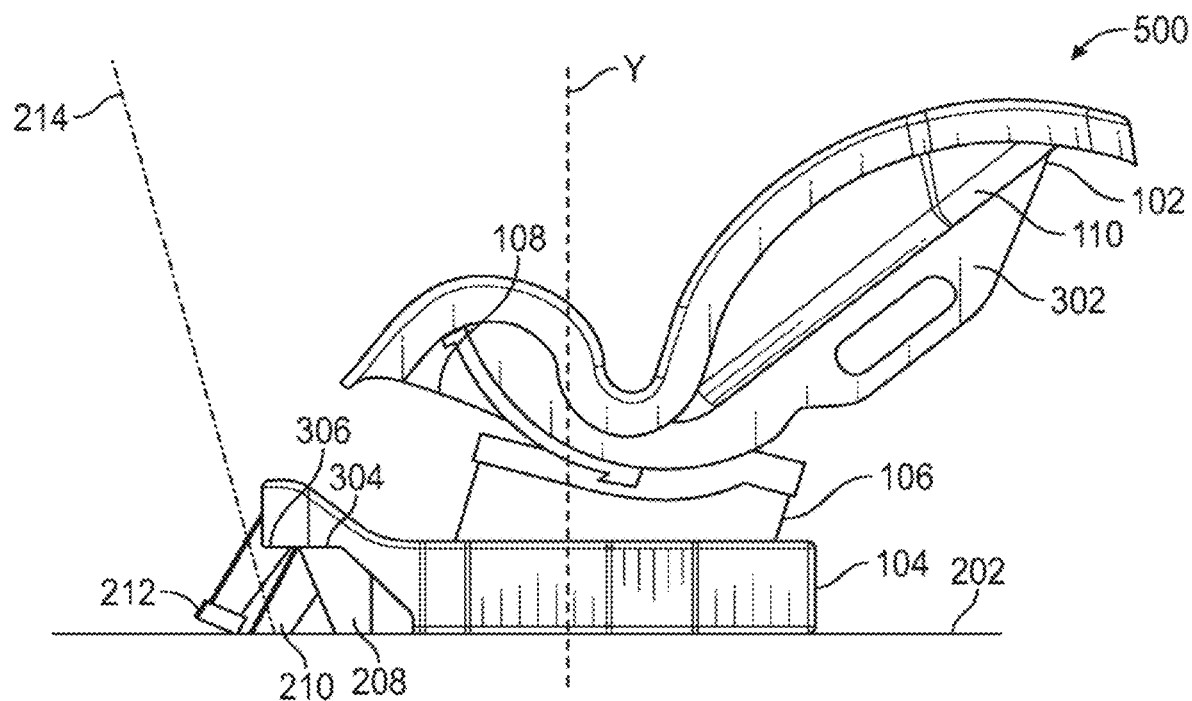
FIG. 5A is a side elevation view of the rotatable child car seat of FIGS. 1A-B installed in the rearward-facing configuration in accordance with one example embodiment of the disclosure.

The retaining flange 122 or another portion of the seat base 104 can also include one or more pin receiving cavities or apertures 124. Each pin receiving cavity or aperture 124 can provide an indentation, cavity, passageway, or channel through all or a portion of the retaining flange 122 and/or side wall 120 from above or along the side of the seat base 104. In certain example embodiments, one or more of the pin receiving cavities or apertures 124 can provide a passageway or channel that extends from a top side of the flange 122 into the cavity 125 positioned below the flange 122. Each pin receiving cavity or aperture 124 is sized and shaped to receive at least a portion of a locking pin 134 therein. In certain example embodiments, the pin receiving cavity or aperture 124 may only extend through a portion of the retaining flange 122 and/or wall 120 rather than all of the way through it. In certain example embodiments, the seat base 104 can include multiple pin receiving cavities or apertures 124 (e.g., any number of cavities or apertures 124 between 1-20). In one example, seven pin receiving apertures 124 are provided in the retaining flange 122 and spaced substantially around the annular ring of the flange 122. In another example embodiment, four pin receiving cavities or apertures 124 are provided in the retaining flange 122 and spaced substantially 90 degrees apart. In other example embodiments, three pin receiving cavities or apertures 124 are provided and the seat 100 is configured to rotate only 90 degrees to the left and the right about the rotational axis Y from an initial position or aperture 124. In one example, the initial position can be with the car seat 102 facing in the rear-facing position as shown in FIG. 5A.

The seat base 104 can include a cavity 125 positioned between the bottom surface 118 and the retaining flange member(s) 122. This cavity 125 can be configured to receive and retain therein a rotating pedestal base 126. For example, the cavity 125 can have a generally cylindrical shape with a diameter that is greater than the diameter of the rotating pedestal base 126.

The seat base 104 can also include a tab channel 105 disposed in and extending along a bottom side of the flange 122. The channel can be elongated and arcuate in shape. The channel can have a width and is configured to receive at least a portion of a rotation limiter tab 166 therein. The channel can have a first end wall and a distal second end wall that limit the range of rotation of the rotating pedestal base 126 through contact with the rotation limiter tab 166.

The rotating pedestal 106 can include a first end 127 coupled to the seat shell 102 and a distal second end 197 coupled to the pedestal base 126. In one example embodiment, the rotating pedestal 106 has generally cylindrical shape with a circular cross-sectional shape along an axis orthogonal to the rotational axis Y. The rotating pedestal 106 can have a constant or variable diameter. For example, the rotating pedestal 106 can include a first portion 128 having a first diameter and a second portion 161 having a generally cylindrical shape and a second diameter that is less than the first diameter and less than the diameter of the pedestal base 126. In one example, at least a portion of the diameter of the rotating pedestal 106 (e.g., the second portion 161) is less than the diameter of the opening defined by the inner wall 123 of the retaining flange 122 and less than the diameter of the rotating pedestal base 126. The pedestal base 126 can be coupled to or integrally formed with the second end 197 of the rotating pedestal 106 and can be configured to be positioned below the retaining flange 122. For example, the pedestal base 106 can be coupled to the bottom side of the second portion 161 of the rotating pedestal 106 using screws, bolts or other coupling devices. In one example, the pedestal base 126 has a diameter that is greater than the diameter of the opening defined by the inner wall 123 of the retaining flange 122. This greater diameter for the pedestal base 126 prevents the pedestal base 126 from being lifted vertically and removed from or falling out of the cavity 125. In certain example embodiments, the pedestal base 126 can include an outer perimeter wall 131. In one example, the outer perimeter wall 131 extends at an angle orthogonal or substantially orthogonal to the bottom surface 118 of the seat base 104. In another example embodiment, the outer perimeter wall 131 can extend at a complementary angle to the angle of the inner wall surface 191 of the seat base 104.

The pedestal base 126 can also include a rotation limiter tab 166. The rotation limiter tab 166 can be a member that extends up from a top side of the pedestal base 126. In one example, the rotation limiter tab 166 can have a substantially cylindrical shape. In other embodiments, the rotation limiter tab 166 can have any other shape. At least a portion of the rotation limiter tab 166 is configured to extend into and move along the tab channel in the bottom side of the flange 122. Contact by the rotation limiter tab 166 with one of the end walls of the tab channel will prevent further rotation of the pedestal 106 and seat shell 102.

The rotating pedestal 106 can also include a first portion 128 having a larger diameter than the second portion 161 and positioned vertically above the second portion 161. In one example, this first portion extends from the second portion 161 to the first end 127. In another example embodiment, the first portion can be a pedestal flanges 128 that extends out from the outer surface of the pedestal 106 and is positioned between the second portion 161 and the first end 127. In one example, a first portion 128 extends radially outward from the second portion 161 and has an outer perimeter that is ring-shaped or substantially ring-shaped. The example first portion or pedestal flange 128 can have an outer diameter that is greater than the diameter of the opening defined by the inner wall 123 of the retaining flange 122.

A locking pin 134 can positioned within or may be operably coupled to the first portion 128. For example, the first portion 128 of the rotatable pedestal 106 can include a cavity configured to receive therein the locking pin 134. The cavity can include an opening along a bottom side of the first portion 128 of the rotatable pedestal 106 through which at least a portion of the locking pin 134 can extend. The locking pin 134 can be movable from a locked position to an unlocked position. In one example embodiment, the locking pin 134 can include a spring or other biasing mechanism to bias the locking pin 134 in the locked position (e.g., downward towards the retaining flange 122).

The rotatable child car seat 100 can also include a locking pin release mechanism 130. In one example, the locking pin release mechanism 130 is coupled to and operably adjustable along the seat shell 102. For example, the locking pin release mechanism 130 can be positioned along the seat bottom 108 on the side of the seat shell 102 or along the front or rear sides of the seat bottom 108. In other examples, the locking pin release mechanism 130 can be positioned along the pedestal 106 or seat base 104. The locking pin release mechanism 130 can be a rotating lever, adjustable switch, pull-tab, press-button, or any other hand-operated mechanism.

The locking pin release mechanism 130 can also include a spring or other biasing member that biases the locking pin release mechanism 130 in a first position and allows at least a portion of the locking pin release mechanism 130 to be manipulated by hand application of a force into a second position (e.g., rotation, translation, extension, etc.). The locking pin release mechanism 130 can then automatically return to the first position due to the biasing force being applied by the spring or other biasing member once the force is no longer being applied to the locking pin release mechanism 130. In one example, the spring is a torsion spring.

A cable wire, tether, or string 132 can be coupled along a first end 132A to the locking pin release mechanism 130 and along a distal second end 132B to the locking pin 134. In one example, the cable 132 can be routed along the back side 113 of the seat shell 102, about a friction reducing member 136, such as a pulley, roller, or radiused or otherwise smooth surface, and to the locking pin 134.

In operation, as shown in FIG. 1F, the locking pin release mechanism 130 can be a rotating lever that can be spring-biased in a first position and manually rotated in the direction R1 to overcome the spring-bias of the spring or other biasing member and into the second position. The rotation of the locking pin release mechanism 130 applies a tension to the cable 132, which overcomes the spring-bias of spring or other biasing member applying a downward force on the locking pin 134 that biases the pin 134 into the pin receiving aperture 124 and pulls the locking pin 134 generally vertically upward out of the pin receiving aperture 124 in the flange 122. This allows the pedestal base 126, first portion 128 and second portion 161 of the pedestal 106, and seat shell 102 to rotate in either direction about the rotational axis Y with respect to the seat base 104. Once manual force is reduced on the locking pin release mechanism 130, the spring-biasing force on the mechanism 130 will cause it to rotate in the direction opposite R1. This will reduce the tension on the cable 132 and allow the spring-biasing force on the locking pin 134 to move the locking pin 134 from the unlocked position generally downward towards the locked position. Once the rotation of the car seat 102, pedestal 106, and pedestal base 126 about the rotational axis Y aligns the locking pin 134 with another pin receiving aperture 124 or cavity in the seat base 104, the locking pin 134 will enter that opening 124 or cavity and lock the car seat 102, first portion 128 and second portion 161 of the pedestal 106, and the pedestal base 126 rotationally in place with respect to the seat base 104.

The rotating pedestal 106 can also include reclining channels 167, 168 and recline stop position apertures 169, 170. At least a portion of the seat shell 102 can ride within the reclining channels 167, 168 to allow the seat shell 102 to be reclined at different angles with respect to the pedestal 106. Position stop tabs (not shown) can be coupled to the seat shell and operably coupled to a stop tab release mechanism 171. The stop tab release mechanism 171 can be a rotating lever, adjustable switch, pull-tab, press-button, or any other hand-operated mechanism. The stop tab release mechanism can include a spring or other biasing devices to bias the stop tab release mechanism into a first position, in which each position stop tab engages one of the recline sop position apertures 169, 170. Each position stop tab can be coupled to the stop tab release mechanism 171 via one or more cables, wires, or tethers. While six recline positions are shown in FIGS. 3A-B, this is for example purposes only, as greater or fewer recline positions and angles can be provided based on the number and positioning of the recline stop position apertures 169, 170.

The example rotatable child car seat 100 can further include two separate and distinct seat belt and/or LATCH tether attachment areas or pathways, which will be described in greater detail with regard to FIGS. 1A-2B and 4-5B. A first seat belt and/or LATCH tether attachment area or pathway can be positioned along the rear side 113 of the seat back 110 of the seat shell 102. When an automobile seat belt or tether of the LATCH system is attached to the first seat belt and/or LATCH tether attachment area or pathway 203, 302, rotation of the seat shell 102 and pedestal 106 with respect to the seat base 104 is prevented or significantly limited because rotation of the seat shell 102 and pedestal 106 would require that the seat belt or LATCH tether attached to the seat shell 102 also extend and rotate with the seat shell 102 and pedestal 106. The first seat belt and/or LATCH tether attachment area or pathway 203, 302 is used when the rotatable child car seat 100 is placed in a forward-facing configuration with regard to an automobile seat (see FIG. 4). Forward-facing configuration, are typically used for children who are older and better able to position themselves in the car seat. In addition, parents or guardians are also typically more experienced with coupling and decoupling a child from a car seat once the child is old enough to sit in the car seat 100 in the forward facing configuration.

A second seat belt and/or LATCH tether attachment area or pathway 304, 306 can be positioned along the rear side of the seat base 104. When the automobile seat belt or tether of the LATCH system is attached to or routed through the second seat belt and/or LATCH tether attachment area or pathway 304, 306, rotation of the car seat 102 with respect to the seat base 104 can be accomplished in the manner described above with reference to FIGS. 1A-5B. The second seat belt and/or LATCH tether attachment area or pathway 304, 306 is used when the rotatable child car seat 100 is placed in a rearward-facing configuration with regard to the automobile seat (see FIG. 5A). Rearward-facing configurations are typically used for infants and younger toddler children who are unable to position themselves in the car seat 100 or may have less-developed fine motor and musculature development. Parents of these younger children may also be less experienced in dealing with coupling and decoupling the child from the car seat 100.

Figure 4:
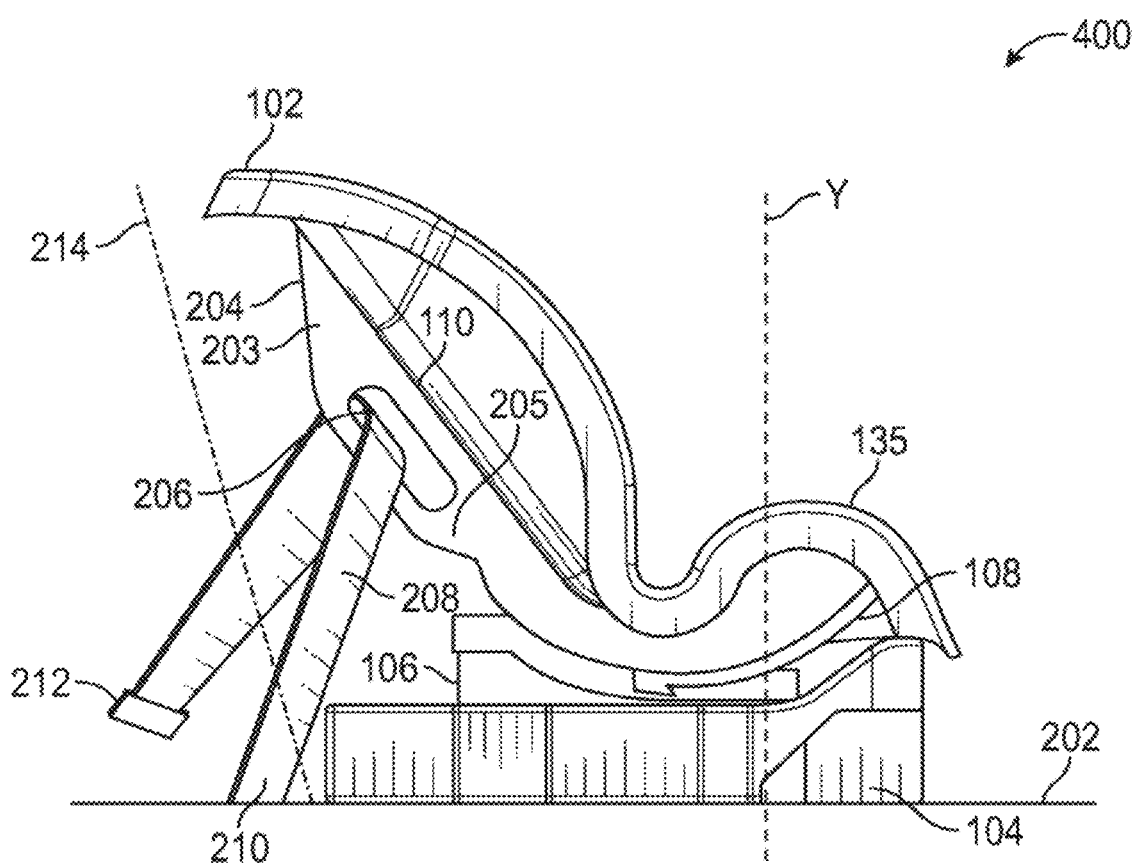
FIG. 4 is a side elevation view of the rotatable child car seat of FIGS. 1A-B installed on an automobile seat in a forward-facing configuration in accordance with one example embodiment of the disclosure.

FIG. 4 is a side elevation view 400 of the rotatable child car seat 100 installed on an automobile seat 202 in a forward-facing configuration, in accordance with one example embodiment of the disclosure. Referring now to FIGS. 1A-4, the rotatable child car seat 100 is positioned in the forward-facing configuration in an automobile, such that the front 135 of the seat shell 102 faces towards the front of the automobile. The seat base 104 rests along the top surface of the automobile seat bottom 202, the seat back 110 of the seat shell 102 is positioned adjacent the front side of the automobile seat back 214, and the child typically faces toward the front of the automobile. The rotatable child car seat 100 can further include the first seat belt and/or LATCH tether attachment area or pathway 203, 302, as well as a handle 207 disposed at a rear side of the seat 202. In one example, the first seat belt and/or LATCH tether attachment area or pathway includes a first seat belt attachment arm 203 and a second seat belt attachment arm 302 (see FIG. 1D). Each of the seat belt attachment arms 203, 302 have a first end 205 coupled to the back side 113 of the seat shell 102 and a distal second end 204 coupled to the back side 113 of the seat shell 102. Each of the seat belt attachment arms 203, 302 can be generally elongated members that each define an opening 206 for receiving an automobile seat belt 208 or LATCH tether therethrough between the respective seat belt attachment arm 203, 302 and the back side 113 of the seat shell 102.

The automobile seat belt 208 can be either a two-point or three-point seat belt and can have a first end 210 coupled to the automobile and a distal second end 212 that can be routed through the openings 206 defined by each seat belt attachment arm 203, 302 and then latched to a latch with a latch plate disposed along the second end 212.

The LATCH tether can include a tether, strap, or elongated piece of material similar to the belt material of the automobile seat belt. One end of the LATCH tether can include a first lower anchor connector (e.g., a latch (e.g., a spring-loaded latch), clip (e.g., a spring-loaded clip), carabiner (e.g., a spring-loaded carabiner), or other coupling device). A distal second end of the LATCH tether can include a second lower anchor connector (e.g., a latch (e.g., a spring-loaded latch), clip (e.g., a spring-loaded clip), carabiner (e.g., a spring-loaded carabiner), or other coupling device). Each of the first lower anchor connector and second lower anchor connector are configured to be removably coupled to corresponding automobile anchors, which may be positioned along the floorboard of the automobile, between the seat bottom and seat back of the automobile seat, along the back side of the seat back of the automobile seat, and/or along the ceiling of the automobile. The first lower anchor connector can be removably coupled to one automobile anchor. The ANCHOR tether can be routed through the openings 206 defined by each seat belt attachment arm 203, 302, and then the second lower anchor connector can be removably coupled to a second automobile anchor.

As the seat belt 208 or ANCHOR tether is routed through the first seat belt and/or LATCH tether attachment area or pathway of the rotatable child car seat 100, which is directly coupled to the seat shell 102 by way of the seat belt attachment arms 203, 302, the seat shell 102 and pedestal 106 are prevented from being rotatable about the rotational axis Y with respect to the seat base 104.

FIG. 5A is a side elevation view 500 of the rotatable child car seat 100 installed in the rearward-facing configuration, in accordance with one example embodiment of the disclosure. Referring now to FIGS. 1A-3B and 5A, the rotatable child car seat 100 is positioned in the rearward-facing configuration in an automobile, such that the front 135 of the seat shell 102 faces towards the rear of the automobile. The seat base 104 rests along the top surface of the automobile seat bottom 202, the seat back 110 of the seat shell 102 is positioned away from the front side of the automobile seat back 214, and the child typically faces toward the rear of the automobile.

The rotatable child car seat 100 can further include a second seat belt and/or LATCH tether attachment area or pathway 304, 306 positioned separately from the first seat belt and/or LATCH tether attachment area or pathway defined by arms 203, 302 described above. The second seat belt and/or LATCH tether attachment area or pathway 304, 306 can include a first seat belt and/or LATCH tether aperture 304 disposed though a rear side of the side wall 120 of the seat base 104 and extending to the top side or front side of the seat base 104 and a second seat belt, and/or LATCH tether aperture 306 disposed though a rear side of the side wall 120 of the seat base 104 and extending to the top side or front side of the seat base 104. Each of the first 304 and second 306 seat belt and/or LATCH tether apertures provide a passageway through at least a portion of the seat base 104 for receiving an automobile seat belt 208 and/or LATCH tether therethrough. A portion of the seat base 104 (e.g., a separation wall 305) can extend between the first aperture 304 and the second aperture 306.

The automobile seat belt 208 can be either a two-point or three-point seat belt and can have a first end 210 coupled to the automobile and a distal second end 212 that can be routed through the openings 304 and 306 and then latched to a latch with a latch plate disposed along the second end 212 of the seat belt. For example, the seat belt 208 can be routed under the seat base 104, extend up through the first seat belt and/or LATCH tether aperture 304, pass over the separation wall 305 along the top side of the seat base 104, extend through the second seat belt and/or LATCH tether aperture 306 from the top side down towards the bottom side of the seat base 104 and extend out from the bottom side 118 of the seat base 104.

The LATCH tether can be the same as described above. The LATCH tether can have the first lower anchor connector removably coupled to one automobile anchor. The ANCHOR tether can be routed through the openings 304 and 306, and then the second lower anchor connector can be removably coupled to a second automobile anchor. For example, the LATCH tether can be routed under the seat base 104, extend up through the first seat belt and/or LATCH tether aperture 304, pass over the separation wall 305 along the top side of the seat base 104, extend through the second seat belt and/or LATCH tether aperture 306 from the top side down towards the bottom side of the seat base 104 and extend out from the bottom side 118 of the seat base 104.

As the seat belt 208 and/or LATCH tether is routed through the second seat belt attachment and/or LATCH tether area or pathway of the rotatable child care seat 100, which is the seat base 104, the seat shell 102 (and the pedestal 106 and pedestal base 126) can continue to rotate with respect to the seat base 104 about the rotational axis Y when manually activated by a user as described herein.

Figure 5B:
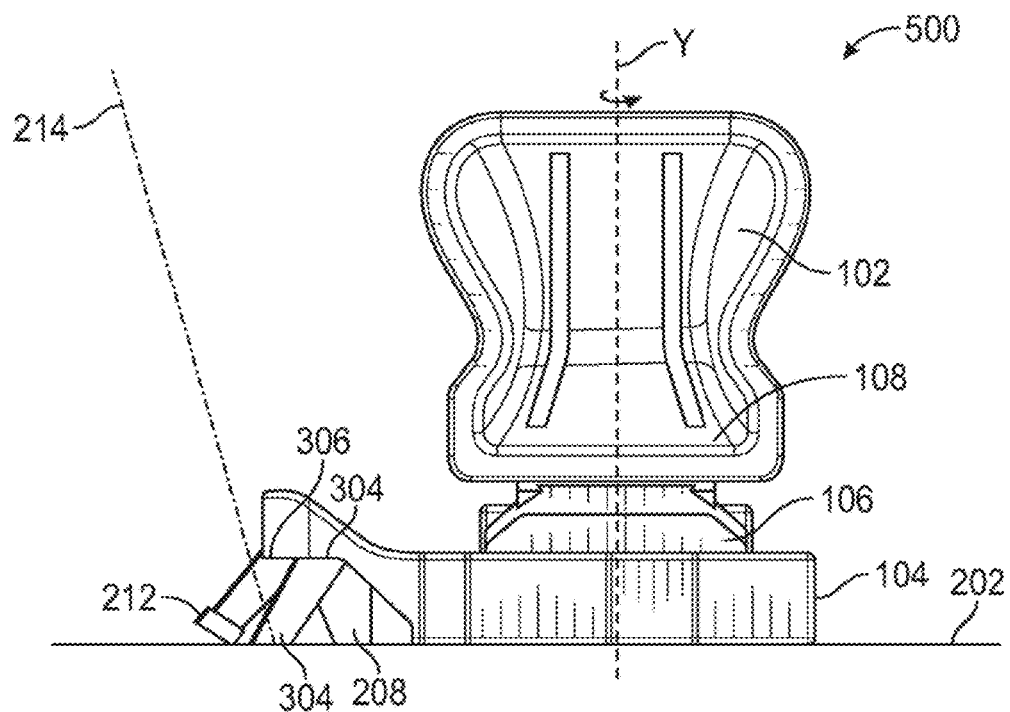
FIG. 5B is the same side elevation view as FIG. 5A with the car seat rotated about 90 degrees in accordance with one example embodiment of the disclosure.

FIG. 5B shows the seat shell 102, pedestal 106, and pedestal base having been rotated counter-clockwise about 90 degrees as compared to FIG. 5A, while the seat base 104 remains coupled to the seat belt 208 of the automobile or the LATCH tether. While the seat shell 102 of FIG. 5B is shown to have rotated counter-clockwise, it also could have been rotated clockwise anywhere in the range of 1-360 degrees, including but not limited to 30, 45, 60, 75, 90, 180, and 270 degrees, if desired by the user. In addition, while the seat shell 102 of FIG. 5B is shown as having been rotated counter-clockwise 90 degrees, it could have additionally been rotated 30, 45, 60, 75, 90, 180, 270 or any other amount of degrees between 1-360 degrees if desired by the user.

Although child safety seat features, functions, components, and parts have been described herein in accordance with the teachings of the present disclosure, the scope of coverage of this patent is not limited thereto. On the contrary, this patent covers all embodiments of the teachings of the disclosure that fairly fall within the scope of permissible equivalents.

Conditional language, such as, among others, "can," "could." "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

The invention claimed is:

1. A car seat comprising:
 a base comprising a channel disposed on a rear side of the car seat; and
 a seat removably coupled to the base, wherein the seat is configured to rotate about the base from a first position to a second position, and the channel is disposed between the base and the seat, the seat comprising:
  a child restraint system;
  a handle disposed at a rear side of the seat, wherein pulling the handle causes the seat to be released from a locked rotational position and to rotate with respect to the seat; and
  a rotation tab configured to engage the tab channel during rotation of the seat when the seat is in a front-facing position;
 wherein the seat is configured to rotate 360 degrees with respect to the base.

2. The car seat of claim 1, wherein the seat is removable from the base only at a first predetermined position and a second predetermined position.

3. The car seat of claim 1, wherein the seat is configured to rotate more than 180 degrees with respect to a vertical axis of the base.

4. The car seat of claim 1, wherein the base comprises:
 a lower surface;
 a first sidewall portion extending from the lower surface; and
 a rim extending radially inward from the first sidewall portion;
 wherein the lower surface and the rim define a cavity that receives the seat.

5. The car seat of claim 4, wherein the first sidewall portion extends upward from a rear end of the lower surface at a first height, the base further comprising:
 a second sidewall portion extending upward from a front end of the lower surface at a second height that is less than the first height.

6. The car seat of claim 5, wherein the base further comprises:
 a concave rear support extending upward from a rear end of the base.

7. The car seat of claim 1, wherein the seat is configured to be secured to the base in a plurality of predetermined positions, wherein the predetermined rotational positions comprise a front-facing position, a side-facing position, and a rear-facing position.

8. The car seat of claim 7, wherein the seat is configured to rotate at least 180 degrees along a non-vertical axis with respect to the base from a front-facing position to a rear-facing position.

9. The car seat of claim 8, wherein an angle of recline of the seat changes as it rotates from a front-facing position to a rear-facing position.

10. The car seat of claim 9, wherein the seat is in an upright position with respect to the base when the seat is in the front-facing position and the seat is in an angled position with respect to the base when the seat is in the rear-facing position.

11. The car seat of claim 1, further comprising:
 a seatbelt attachment pathway extending from a first side of the base to a second side of the base, wherein the seatbelt attachment pathway is disposed at a rear end of the base, and wherein the seatbelt attachment pathway is configured to receive a portion of an automobile seatbelt to secure the base to an automobile seat.

12. A car seat comprising:
 a base comprising:
  a bottom surface;
  one or more sidewall portions extending from the bottom surface;
  a rim extending radially inward from the one or more sidewall portions, wherein the bottom surface and the rim define a cavity configured to receive the seat;
  a seatbelt attachment pathway extending from a first side of the base to a second side of the base, wherein the seatbelt attachment pathway is disposed at a rear end of the base, and wherein the seatbelt attachment pathway is configured to receive a portion of an automobile seatbelt to secure the base to an automobile seat; and
  a channel;
 a seat removably coupled to the base, wherein the seat rotates 360 degrees with respect to the base, the seat comprising a tab configured to engage the channel; and
 a child restraint system coupled to the seat.

13. The car seat of claim 12, wherein the one or more sidewall portions comprise:
 a first sidewall portion extending vertically upward from a rear end of the bottom surface at a first height; and
 a second sidewall portion extending vertically upward from a front end of the bottom surface at a second height, wherein the second height is shorter than the first height.

14. The car seat of claim 12, further comprising:
 a concave rear support extending vertically upward from a rear end of the base.

15. The car seat of claim 12, wherein the seat is configured to secure to the base in a plurality of predetermined positions, wherein the predetermined positions comprise a front-facing position and a rear-facing position.

16. The car seat of claim 15, wherein the seat is configured to rotate at least 180 degrees along a non-vertical axis with respect to the base from a front-facing position to a rear-facing position.

17. The car seat of claim 16, wherein an angle of recline of the seat changes as the seat rotates from a front-facing position to a rear-facing position, such that the seat is in an upright position with respect to the base when the seat is in the front-facing position and the seat is in an angled position with respect to the base when the seat is in the rear-facing position.

\* \* \* \* \*